United States Patent
Shibata

(10) Patent No.: US 7,573,535 B2
(45) Date of Patent: Aug. 11, 2009

(54) IMAGE DATA PROCESSING CIRCUIT

(75) Inventor: Koji Shibata, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 425 days.

(21) Appl. No.: 10/592,765

(22) PCT Filed: Mar. 15, 2005

(86) PCT No.: PCT/JP2005/005054

§ 371 (c)(1),
(2), (4) Date: Sep. 14, 2006

(87) PCT Pub. No.: WO2005/099267

PCT Pub. Date: Oct. 20, 2005

(65) Prior Publication Data

US 2008/0145029 A1 Jun. 19, 2008

(30) Foreign Application Priority Data

Mar. 31, 2004 (JP) .............................. 2004-104903

(51) Int. Cl.
H04N 5/00 (2006.01)
H04N 9/64 (2006.01)
(52) U.S. Cl. ...................... 348/714; 348/715; 348/616; 348/466; 348/607; 714/746; 714/764
(58) Field of Classification Search ................. 348/714, 348/715, 607, 616, 617, 466; 386/2, 3; 714/746, 714/747, 764, 765
See application file for complete search history.

(56) References Cited

U.S. PATENT DOCUMENTS

| 4,345,272 | A | * | 8/1982 | Shirota | 348/617 |
| 4,517,600 | A | * | 5/1985 | Reitmeier | 348/616 |
| 5,365,604 | A | * | 11/1994 | Kwok et al. | 382/275 |
| 5,892,593 | A | * | 4/1999 | Kim | 358/497 |
| 6,993,251 | B1 | * | 1/2006 | Phillips et al. | 386/125 |
| 2003/0186646 | A1 | * | 10/2003 | Shibata et al. | 455/3.01 |

FOREIGN PATENT DOCUMENTS

| JP | 10-336537 | 12/1998 |
| JP | 2001-268470 | 9/2001 |
| JP | 2003-299034 | 10/2003 |

* cited by examiner

Primary Examiner—M. Lee
(74) Attorney, Agent, or Firm—Drinker Biddle & Reath LLP

(57) ABSTRACT

Disclosed is an image data processing method capable of reducing visual discomfort perceived by users in the recovery from a receive error in a receiver. According to the image data processing method, in recovery processing of a video motion damper system in an image data processing circuit, a frequency of occurrence of the receive error before and after the time of recovery from the receive error is judged. According to the judgment result, the time period for switching of the output tap in recovery processing is adjusted. When the frequency of occurrence of the receive error is high, the recovery processing is halted until the selected tap position during the recovery is returned to the output tape position of the first FIFO of a frame memory.

3 Claims, 7 Drawing Sheets

FIG. 2

| INPUT DATA | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|
| FIFO 1 OUTPUT | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| FIFO 2 OUTPUT | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| FIFO 3 OUTPUT | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| FIFO 4 OUTPUT | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| FIFO 5 OUTPUT | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| FIFO 6 OUTPUT | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| FIFO 7 OUTPUT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| OUTPUT DATA | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |

FIG. 7

IMAGE DATA PROCESSING CIRCUIT

TECHNICAL FIELD

The present invention relates to an image data processing circuit and the like.

BACKGROUND ART

Image data processing methods employing a video motion damper circuit (hereinafter referred to simply as "VMD circuit") and video motion damper system (hereinafter referred to simply as "VMDS") are known as methods for handling receive errors in a digital video receiver which receives digital broadcasting such as ISDB-T (Integrated Services Digital Broadcasting for Terrestrial). A VMD circuit and a VMDS are disclosed, for example, in Patent document 1 (Japanese Patent Kokai No. 2003-299034). The VMDS is capable of reducing visual discomfort due to interruptions in reproduced images accompanying the receive errors by supplying a mixture of video and still images using image data stored within the circuit upon occurrence of and recovery from the receive errors.

FIG. 1 illustrates a configuration of a conventional VMD circuit. In the figure, a frame memory 11 indicated by FIFOs 1 to 7 is a first-in first-out type memory. In all stages the FIFOs 1 to 7 of the frame memory are connected in series. The output of the frame memory of the previous stage is connected to the input of the frame memory of the next stage, thereby to form a single large FIFO-type memory unit. In addition, output taps are provided to extract image data at the respective outputs of the stages of the frame memory 11. Each of the FIFOs 1 to 7 of the frame memory stores successive digital image data sets received by the digital video receiver, for example, in field units or in frame units. The number of the stages of the FIFOs of the frame memory 11 is of course not limited to that of the circuit illustrated in FIG. 1.

A tap selection portion 12 is a circuit which selects/switches an output tap from/between the stages of the frame memory 11, and extracts the received digital image data from the selected output tap.

An error detection portion 13 is a circuit which receives various signals representing errors such as out-of-carrier-synchronization errors, packet errors, or data error rate which are detected by a front-end circuit, data reproducing circuit or similar (not shown) of the digital video receiver. The error detection portion 13 further generates a detection signal in response to a predetermined error state, and sends the detection signal to the VMDS control portion 14.

A VMDS control portion 14 is a circuit which controls tap switching of the tap switching portion 12 according to a prescribed algorithm of the VMDS, based on the detection signal from the error detection portion 13.

The VMD circuit 10 within the digital video receiver may be provided between a channel decoder circuit which is a block for decoding coded compressed data in accordance with a broadcast standard, and a source decoder circuit which is a block for decompressing the compressed data and converting the decompressed data into a baseband signal. Alternatively, the VMD circuit 10 may be provided between the source decoder circuit and a video encoder circuit which is a block for converting digital image signals into analog image signals (none of these circuits are shown).

VMDS processing by the VMD circuit 10 will now be explained.

First, when the receive error does not occur, the tap switching portion 12 selects the output tap of the FIFO 4 in the frame memory 11. An output from the FIFO 4 is supplied to each of later-stage circuits as image output data from the VMD circuit 10. The FIFO 4 corresponds to the fourth frame memory from the FIFO 1 of the first stage of the frame memory 11. Hence when one frame of image data is stored in the frame memory of each of the respective stages of the FIFOs 1 to 7, referring to an output data table as illustrated in FIG. 2, image data delayed from the current input image data by four frames is output from the VMD circuit 10.

The numbers in FIG. 2 represent frame numbers of the image data, and the number surrounded by broken line represents the frame number of image data output from the FIFO tap selected by the tap switching portion 12.

Next, operation of the VMD circuit 10 during receive error occurrence and recovery will now be explained with reference to FIG. 3.

As illustrated in FIG. 3, it is assumed that a receive error has occurred in the 12th frame of input image data, and that the VMDS control portion 14 has been notified of the error information by the error detection portion 13.

After the FIFO 4 outputs the eighth frame, the VMDS control portion 14 then issues an instruction to the tap switching circuit 12 to switch the output tap to the FIFO 5. Then, after the FIFO 5 outputs two frames of the eighth and ninth frames, the VMDS control portion 14 issues an instruction to the tap switching circuit 12 to the next output tap position.

In response, the tap switching circuit 12 switches the output tap, and the processing as illustrated in FIG. 3 continues until the 11th frame that is the final normal frame received before occurrence of the receive error is output from the FIFO 7. Processing of switching the output tap position of the frame memory upon occurrence of a receive error is called "video motion damp" (VMD) processing.

Thereafter it is assumed that recovery is performed from the receive error at the 18th frame of the input image data.

When all data that had been stored before the error occurrence is output (i.e., when the 11th frame is output from the FIFO 7), the VMDS control portion 14 issues to the tap switching circuit 12 an instruction to select the output tape position of the FIFO 1 storing the 18th frame which is the beginning of image data after the error recovery.

Thereafter, as illustrated in FIG. 3, the VMDS control portion 14 issues to the tap switching circuit 12 instructions to sequentially advance the output tap position upon each output of a prescribed number of frames. When the output tap position of the frame memory 11 reaches the FIFO 4, the VMDS control portion 14 then issues an instruction to halt the tap switching processing by the tap switching portion 12 and to fix the output tap position at the FIFO 4.

Processing of switching the output tap position of the frame memory 11 after recovery from a receive error is called recovery processing.

During the intervals of the above-described VMD processing and recovery processing, as illustrated in the output data table of FIG. 3, a mixture of a video output with the frame number increasing one by one and a still image output with the stationary frame number is output from the VMD circuit 10. Accordingly, compared with the case in which the outputs of reproduced images are merely still images in response to a receive error, visual discomfort can be reduced.

However, in the reception environment in which receive errors occur frequently, for example, the VMD processing and the recovery processing may be occur simultaneously, and processing burden on a microprocessor and an internal memory of a control portion of the VMD circuit 10 may be increased. Furthermore, as explained above, the VMD processing and the recovery processing both require substantially the same amount of processing time. Nevertheless, the VMD processing is essentially necessary function, and the recovery processing is no more than preparation for the VMD processing upon occurrence of the next error. During processing intervals of the both types of processing, motion in the reproduced images is unnatural compared with during reception of normal data. So it is preferable that a ratio of the still images output during processing time is low.

DISCLOSURE OF THE INVENTION

It is an object of the present invention is, for example, to provide an image data processing circuit capable of reducing visual discomfort at the time of recovery from receive errors in a receiver.

According to an aspect of the present invention, there is provided an image data processing circuit comprising: data writing means for writing received image data into an image data memory in turn; data reading means for reading image data from the image data memory in response to read addresses; and error detection means for detecting a receive error, wherein the data reading means selectively performs a still image reading mode and a video reading mode. The still image reading mode causes the data reading means to read the image data while temporarily fixing the read addresses within an error occurrence interval, and the video reading mode causes the data reading means to read the image data while changing the read addresses in the order of writing the image data into the image data memory. The image data processing circuit further comprising: error history storage means for storing, as error history information, a status of occurrence of a receive error based on the detection results of the error detection means; and control means for detecting recovery from the receive error based on the detection results and controlling the data reading means based on the error history information stored in the error history storage means in response to the detection.

BRIEF DESCRIPTION OF THE DRAWINGS

FIG. 2 is a data transition diagram illustrating the status of output data transitions upon reception of normal data in the VMD circuit of FIG. 1;

FIG. 7 is a data transition diagram illustrating processing of an image data processing method according to a second embodiment of the present invention.

EMBODIMENTS FOR CARRYING OUT THE INVENTION

An image data processing circuit according to one embodiment of the present invention will now be explained with reference to FIG. 4.

Figure 4:
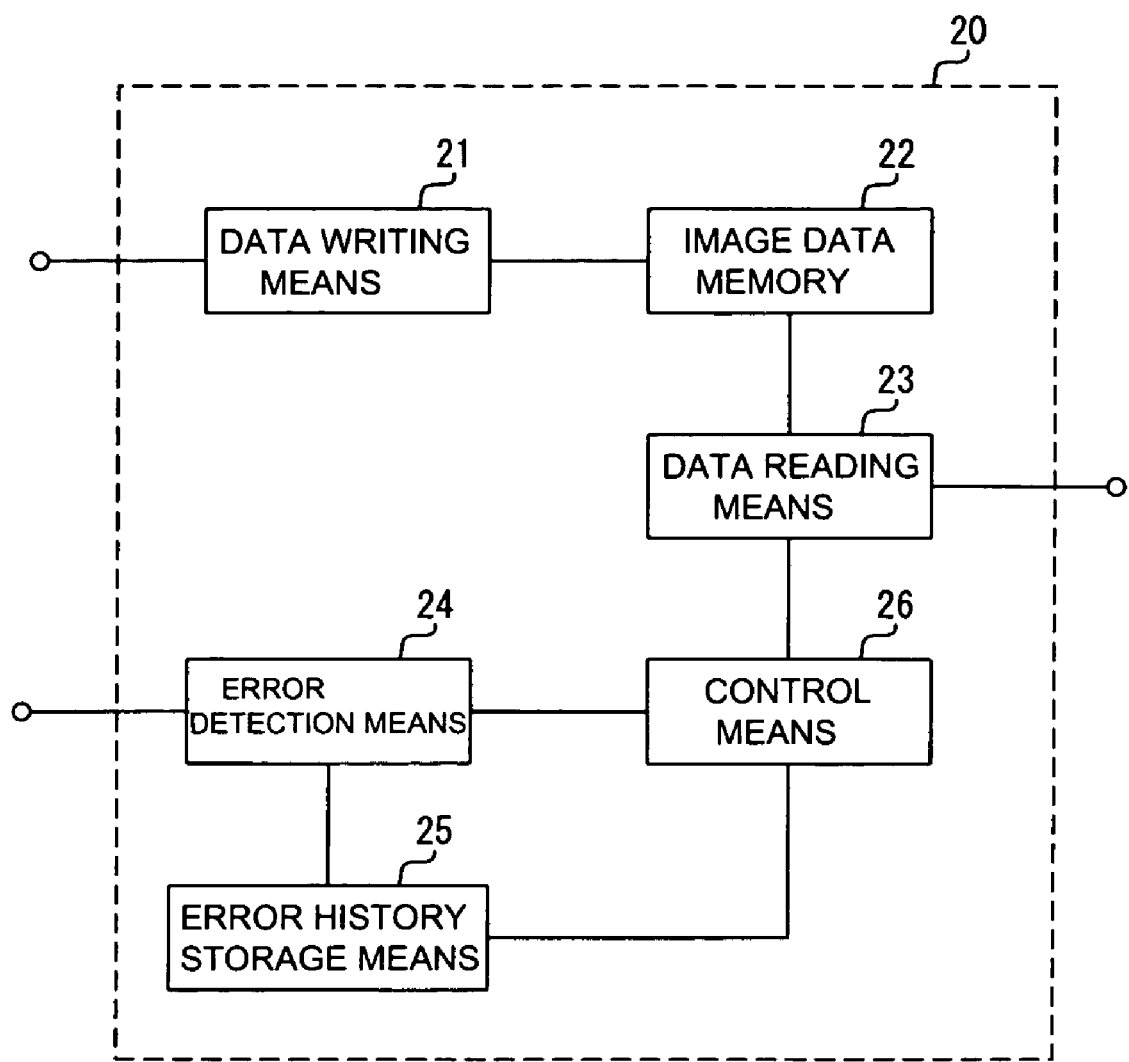
FIG. 4 is a block diagram illustrating an image data processing circuit according to an embodiment of the present invention.

FIG. 4 is a block diagram illustrating a configuration of an image data processing circuit according to an embodiment of the present invention. Referring to FIG. 4, the image data processing circuit 20 comprises data writing means 21, an image data memory 22, data reading means 23, error detection means 24, error history storage means 25, and control means 26.

In the image data processing circuit 20, the data writing means 21 is a portion which writes data received by a receiver within which the image data processing circuit 20 is provided, to a prescribed address in the image data memory 22.

The image data memory 22 is a portion which stores data written by the data writing means 21.

The data reading means 23 is a portion which reads image data from a prescribed address in image data memory 22.

The error detection means 24 is a portion which detects errors in received signals in the receiver including the image data processing circuit 20.

The error history storage means 25 is a portion which stores, as history information with respect to the status of error occurrence, the results of detection by the error detection means 24.

The control means 26 is a portion which generates prescribed read addresses and controls the data reading means 23 such that desired data is caused to be read from image data memory 22 by the data reading means 23.

Next, operation of the image data processing circuit 20 according to an embodiment of the present invention will be explained.

The control means 26, upon judging based on the detection results of the error detection means 24 that an occurrence interval of a receive error begins, performs control to cause the data reading means 23 to selectively execute the still image reading mode and video reading mode. Here, the still image reading mode is a mode of reading image data with the read addresses fixed for a short time, and the video reading mode is a mode of reading image data by changing the read address in the writing order of the image data. The processing in which the data reading means 23 selectively executes the above two modes during the error occurrence interval is called video motion damper (VDM) processing.

On the other hand, the control means 26, upon judging based on the detection results of the error detection means 24 that there is recovery from the receive error, performs control to cause the data reading means 23 to selectively execute the still image reading mode and the video reading mode when the data stored after recovery from the receive error is read out from image data memory 22. By performing the operation after recovery from the receive error, the data read by the data reading means 23 can be delayed from the data written by the data writing means 21. As a result, a configuration having the same function as a buffer for the read data is obtained. The processing of performing after receive error recovery to cause the data reading means 23 to selectively execute the above two modes is called recovery processing.

When reading data from image data memory 22 after receive error recovery, the control means 26 controls the data reading means 23 in accordance with the history information indicating the status of occurrence of the receive error. The history information is stored in the error history storage means 25.

Specifically, the control portion 26, upon judging based on the above history information that the frequency of receive error occurrence is low (for example, that the frequency of occurrence is less than a prescribed first threshold value), performs control to cause the data reading means 23 to execute the video reading mode following data reading after receive error recovery, for a longer interval than in other cases (for example, the case in which the frequency of occurrence is equal to or higher than the first prescribed threshold value). In the status in which the frequency of receive error occurrence is low, the receive state is stable, and so there is no need to provide the above buffer for reading of data immediately after recovery from a receive error. Hence by executing a video read mode for a long period of time from data reading immediately after error recovery, video can be reproduced immediately after the error recovery. The frequency of occurrence of receive errors may be defined according to the number of occurrence of receive errors during a prescribed time. Alternatively, together with the number of occurrence of receive errors, the time of occurrence of receive errors may also be taken into consideration.

In the status in which the frequency of receive error occurrence is low, the control means 26, when causing execution of recovery processing in order to provide a buffer for read data, may perform control so as to cause execution of the video read mode over a longer period of time than in a status other than the status of the low frequency of occurrence. Therefore, it is possible to cause users to constantly perceive display of reproduced video.

On the other hand, when the control means 26 judges based on the history information that the frequency of occurrence of receive errors is high (for example, that the frequency of occurrence is equal to or above a second prescribed threshold value), the data reading means 23 is caused to execute the video read mode following data reading immediately after receive error recovery until the next receive error occurs. Under circumstances of a high occurrence frequency of the receive errors, the receive state is unstable, and there is a high probability of need to execute the VMD processing because an error occurs soon after recovery from receive errors. Under such circumstances, by continuing to execute video read mode without executing recovery processing, it is possible to avoid switching current processing to the VMD processing during the recovery processing, thereby to reduce processing load on the control portion.

Additionally, under such circumstances of the high frequency of receive error occurrence, the control portion 26 judges that there is the status in which the capacity of the above buffer is approaching its maximum if the time when the data writing means 21 writes data is close to the time when the data reading means 23 read data. Hence in this case, an attempt to perform recovery processing may be made in order to secure the capacity of the buffer.

As explained above, the image data processing circuit according to the embodiment of the present invention, in reading data after recovery from a receive error, controls the data reading means 23 using the history information which stores the status of the receive error occurrence. Therefore, image reproduction suitable for visual perception for users can be performed, and processing load on the control means 26 can be reduced.

First Embodiment

Figure 1:
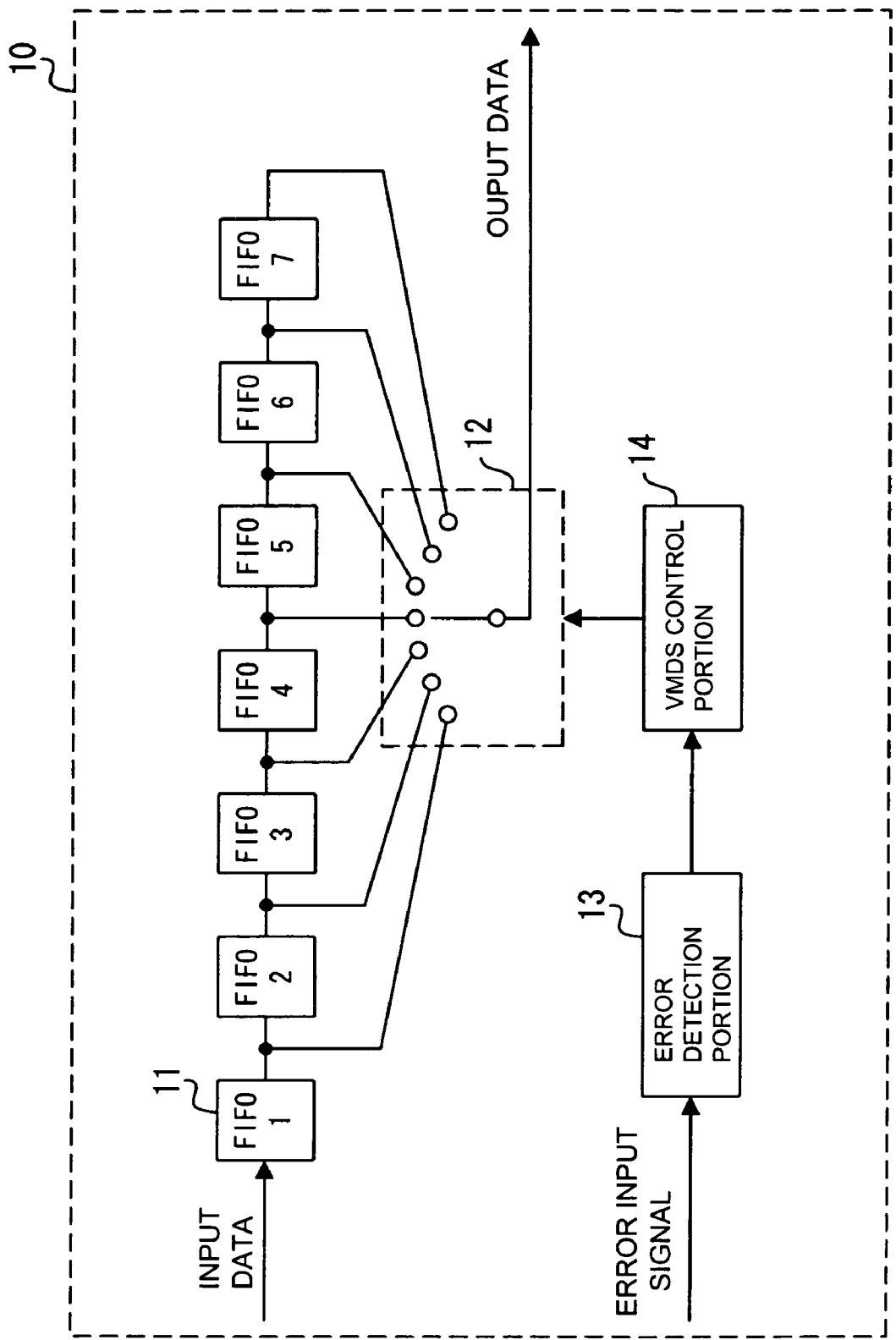
FIG. 1 is a block diagram illustrating the configuration of the conventional VMD circuit.
Figure 3:
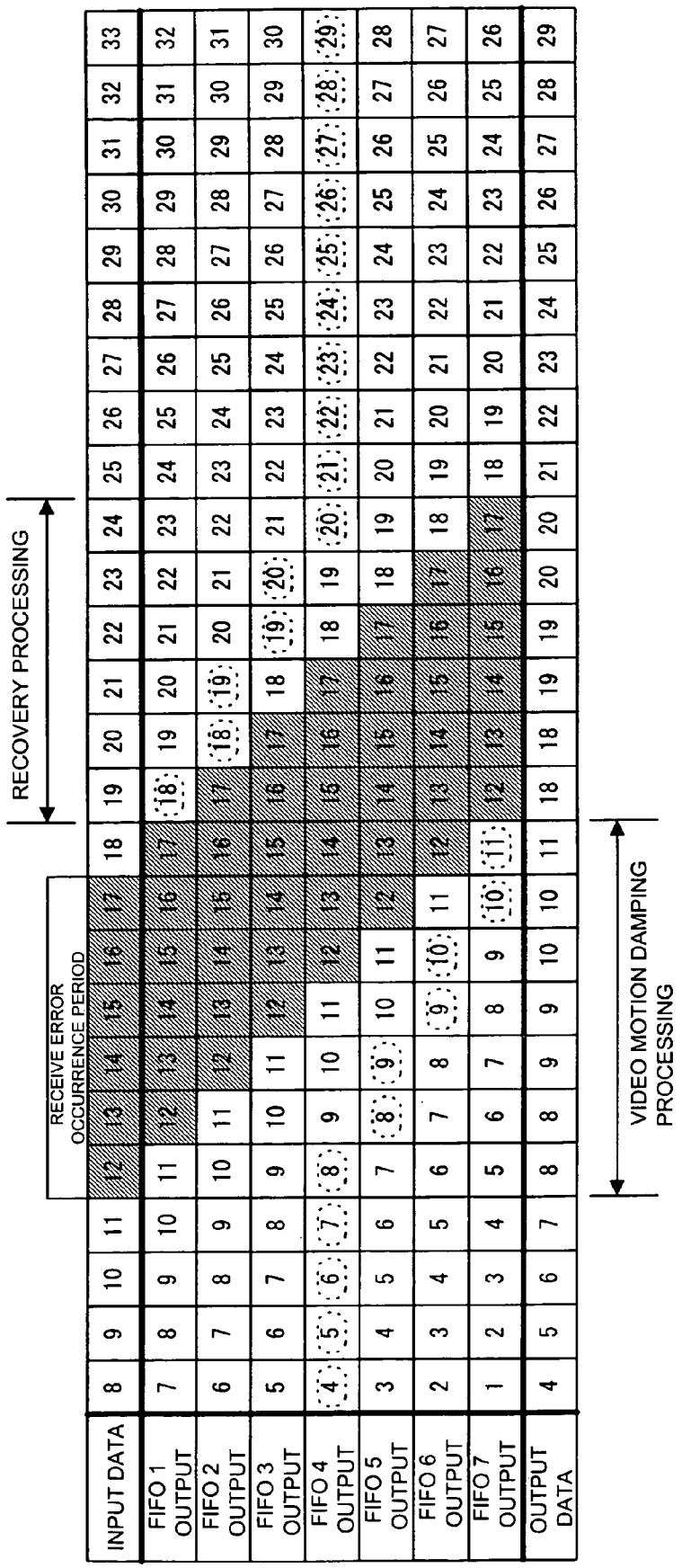
FIG. 3 is a data transition diagram illustrating the status of output data transitions upon occurrence of a receive error in the VMD circuit of FIG. 1.

A first embodiment of an image data processing method performed by an image data processing circuit of an aspect of the invention will be explained with reference to an output data transition diagram of FIG. 5. This embodiment describes a method of recovery processing in a case of a low frequency of receive error occurrence. For convenience in explaining processing, the circuit illustrated in FIG. 1 is used as the circuit that performs recovery processing according to this embodiment.

Figure 5:
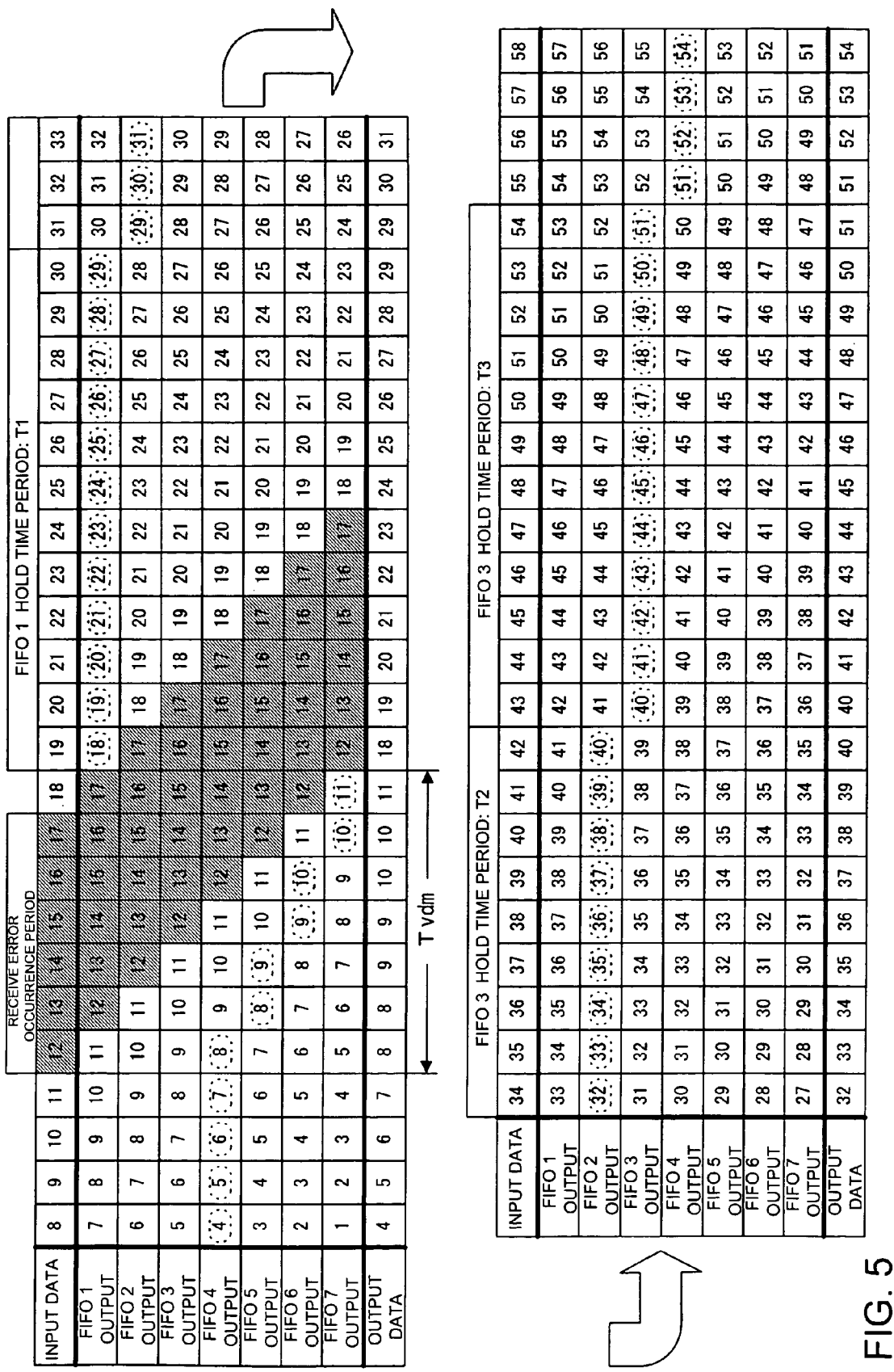
FIG. 5 is a data transition diagram illustrating processing of an image data processing method according to a first embodiment of the present invention.

As illustrated in FIG. 5, it is assumed that a receive error occurs in the 12th frame of the input image data, and that the error detection portion 13 notifies the VMDS control portion 14 of the error. As a result, the VMD circuit 10 executes the VMD processing according to the above-described VMDS algorithm.

Thereafter, it is assumed that receive error recovery is completed in the 18th frame of the input image data. In the VMD circuit 10, at the time when the FIFO 7 outputs the 11th frame which is the last image data stored in frame memory 11 before the error occurrence, the output tap of the FIFO 1 storing the 18th frame of the first image data after error recovery is selected.

In this embodiment, the VMDS control portion 14 can detect the frequency of occurrence of receive errors before and after the time of the receive error recovery on the basis of the information from the error detection portion 13. The frequency of occurrence of receive errors may be determined based on the number of occurrence of receive errors in unit time, for example. Alternatively, the frequency may be determined based on the frequency of occurrence by comparison of the calculated occurrence frequency with a prescribed threshold value.

The VMDS control portion 14, upon recognizing that the frequency of occurrence of receive errors is low, does not perform the conventional recovery processing according to the interval of switching the output tap. Instead the VMDS control portion 14 fixes the output tap position of frame memory 11 at the FIFO 1 initially selected after receive error recovery, for a prescribed time period T1. It is preferable that the time period T1 is set to be sufficiently long compared with the time Tvdm required for the VMD processing of FIG. 5 so as to reduce the visual discomfort.

After the time period T1 has elapsed, that is, at the 31st frame of the input image data of FIG. 5, the VMDS control portion 14 issues an instruction to the tap switching circuit 12 to advance the output tap position of frame memory 11 to FIFO 2. Then, after prescribed time T2 has elapsed, the VMDS control portion 14 issues an instruction to the tap switching circuit 12 to advance the output tap position to the FIFO 3. After a prescribed time period T3 has elapsed, the VMDS control portion 14 issues an instruction to the tap switching circuit 12 to advance the output tap position to the FIFO 4.

As explained above, according to this embodiment the time interval for switching the output tap position of frame memory 11 in the recovery processing is set to be comparatively long, so that the ratio of the time of the unchanged frame number during the output tap switching to the recovery processing interval (T1+T2+T3) can be reduced. That is, during the recovery processing, it is possible to lower the ratio of still images in the output image data. Furthermore, preparation for the next motion damping processing can be performed, and the visual discomfort during the recovery processing can be reduced.

In the example illustrated in FIG. 5, the time periods for holding the output tap position at the FIFOs 1 through 3 are set to the following condition:

T1=T2=T3.

Nevertheless, this embodiment is not limited to the above condition.

Figure 6:
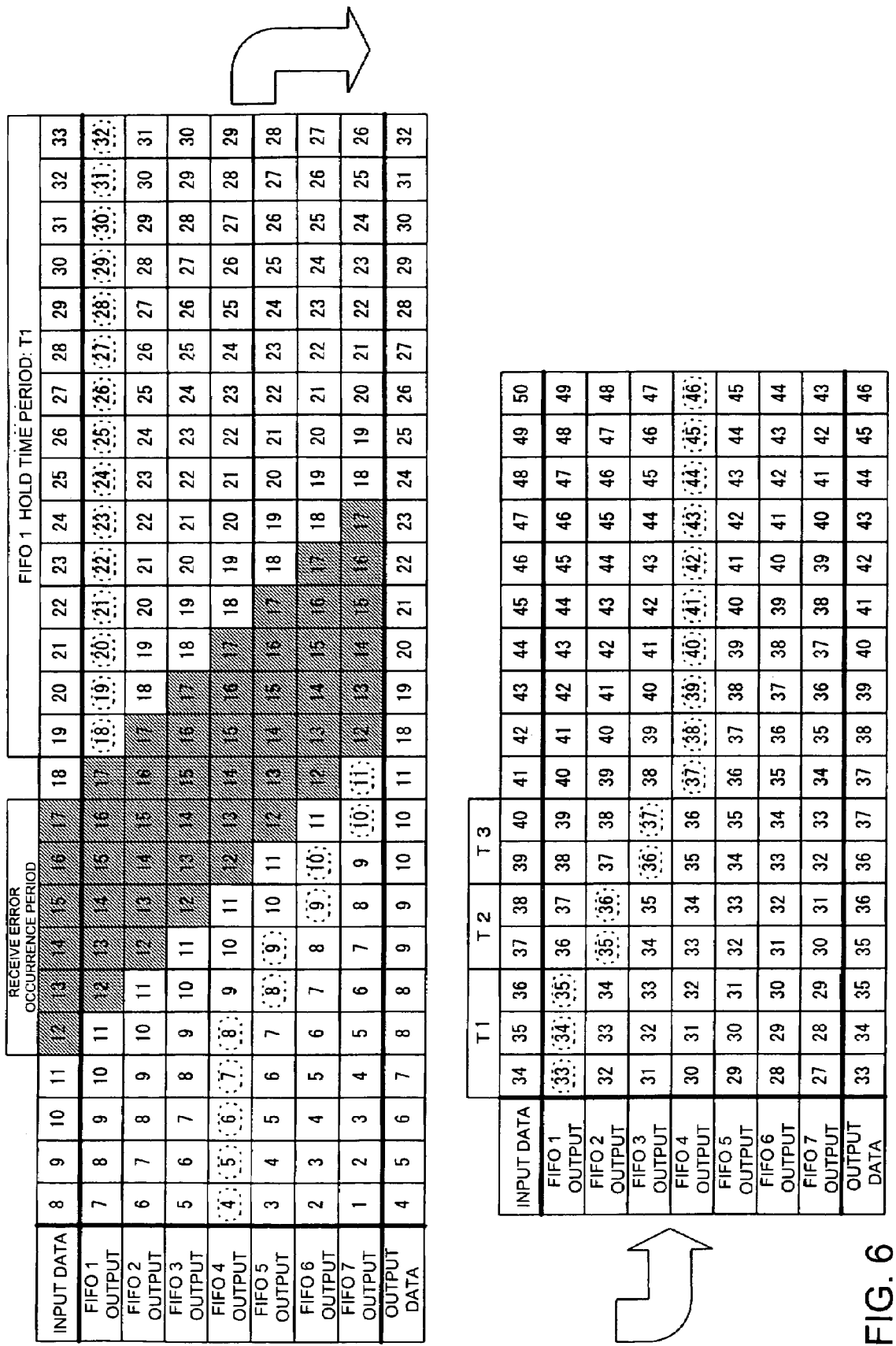
FIG. 6 is a data transition diagram illustrating processing according to a modified embodiment of FIG. 5.

For example, as illustrated in the output data transition diagram of FIG. 6, the output tap position holding time periods at the FIFOs 1 through 3 may be set to the following condition:

T1>T2, T3.

In this case, after receive error recovery the output tap of the FIFO 1 can be selected for the comparatively long interval T1, following which the recovery processing is performed using time periods of normal tap switching, before returning the output tap position to the FIFO 4. In this case also, the VMD processing and the recovery processing can be performed over sufficient time intervals, so that the visual discomfort can be alleviated.

Second Embodiment

Next, a second embodiment of an image data processing method performed by an image data processing circuit according to the present invention will now be explained with reference to the output data transition diagram of FIG. 7. This embodiment describes a method of recovery processing (i.e., R processing) in the status in which the frequency of receive error occurrence is comparatively high. For the convenience of description, the circuit executing the recovery processing in this embodiment is the same as in the first embodiment.

Figure 7:
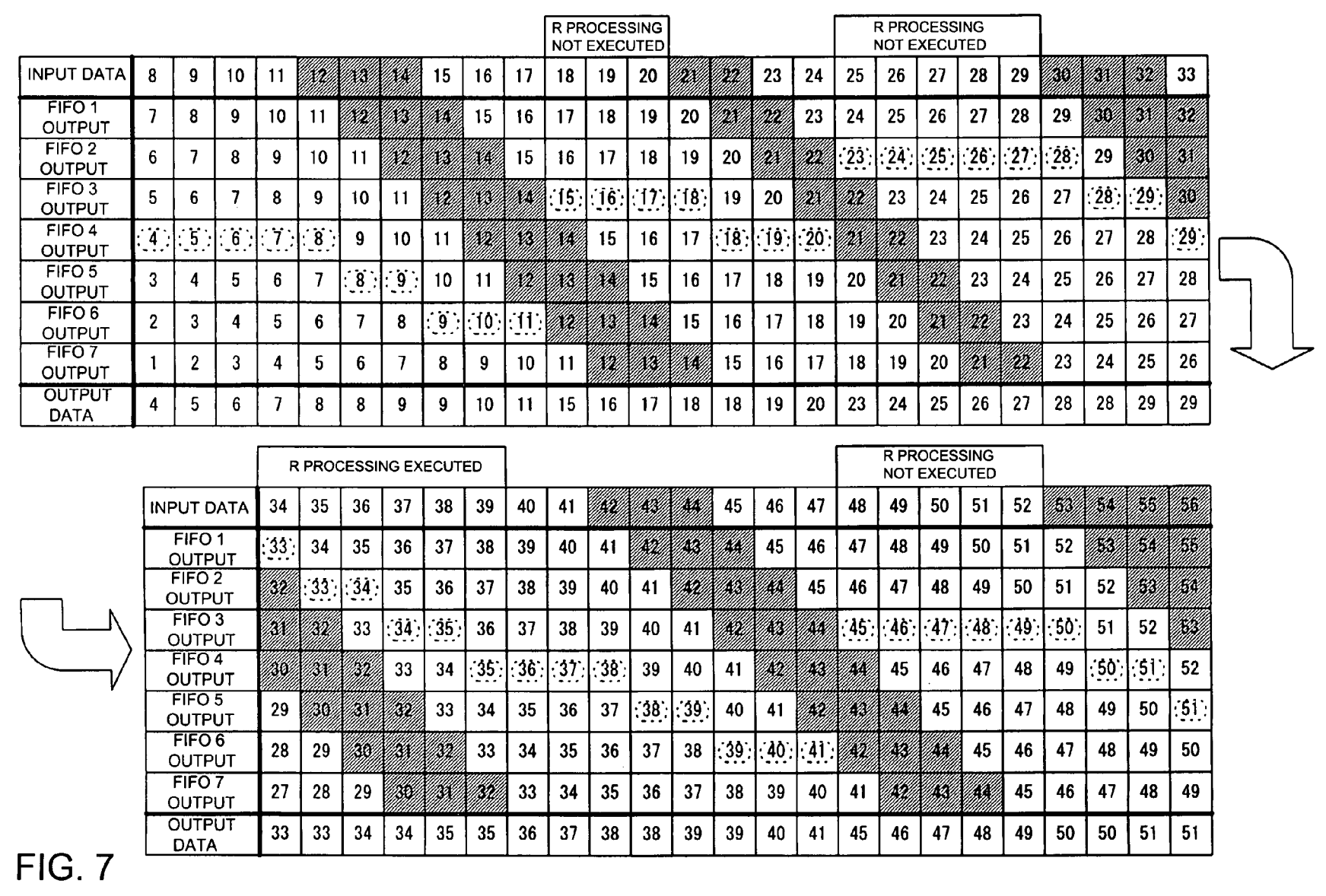

As illustrated in FIG. 7, it is assumed that a receive error occurs in the 12th frame of the input image data, and that the VMDS control portion 14 is notified of this error by the error detection portion 13. This is accompanied by executing of the VMD processing by the VMD circuit 10 according to the above-described VMDS algorithm.

Thereafter, it is assumed that there is recovery from the receive error in the 15th frame of the input image data. After the FIFO 6 outputs the 11th frame of the last image data stored in frame memory 11 until the error occurrence, the VMD circuit 10 selects the output tap position of the FIFO 3 storing the 15th frame of the first image data after error recovery.

In this embodiment, the VMDS control portion 14 can detect the frequency of occurrence of receive errors before and after the time of the receive error recovery based on information from the error detection portion 13. The frequency of occurrence of receive errors may for example be determined based on the number of occurrence of receive errors in unit time. Alternatively, the frequency of occurrence may be determined by comparison of the computed occurrence frequency with a prescribed threshold value. It is assumed that, in the example of FIG. 7, prior to the receive error occurring in the 12th frame, numerous receive errors not shown have occurred, and that the frequency of receive error occurrence is high.

The VMDS control portion 14, upon recognizing that the frequency of occurrence of receive errors is high, firstly checks the output tap position of the frame memory that has been selected as a frame memory storing the first image data after error recovery. If the output tap position is not at the first FIFO 1 of frame memory 11, the conventional recovery processing is not performed, and the selected tap position (the FIFO 3) is maintained without being changed.

Thereafter, in the example shown in FIG. 7, a receive error again occurs in the 21st frame of the input image data. Upon detecting the error, the VMDS control portion 14 enters the VMD processing and issues an instruction for tap switching from the FIFO 3 to the FIFO 4.

In FIG. 7, recovery from the receive error occurring in the 21st frame occurs in the 23rd frame immediately thereafter, so that when the 20th frame data is output from the FIFO 4, the VMD circuit 10 halts the VMD processing. The VMDS control portion 14 then outputs to the tape switching portion 12 an instruction to select the output tap of the FIFO 2 storing the 23rd frame of the first received data after the error recovery.

In this case also, the VMDS control portion 14 recognizes that the frequency of receive error occurrence at the same time is high, and that the output tap position initially selected after error recovery is not the initial FIFO of the frame memory 11. Thus, the conventional recovery processing is not performed, and the selected tap position is maintained at the FIFO 3.

Thereafter, when a receive error again occurs in the 30th frame of the input image data, the VMD processing is performed, and recovery from the receive error occurs in the 33rd frame. At this time, the output tap position selected after the error recovery is returned to the FIFO 1 of the first stage of frame memory 11. The VMDS control portion 14, upon recognizing this state, issues to the tap switching portion 12 an instruction to execute the conventional recovery processing. In response, the normal recovery processing is performed in the VMD circuit 10 for the 34th frame to the 39th frame of the input image data. In the 39th frame the output tap position is fixed at the FIFO 4 in the normal state. The description of operations with respect to the 40th and the subsequent frames of input image data is substantially the same as the above description, and the details is omitted.

As explained above, in this embodiment the VMD circuit 10 performs only the VMD processing upon the receive error occurrence without performing the conventional recovery processing, until the position of the output tap selected after the receive error recovery returns to the initial FIFO of the frame memory 11. Therefore, even when there is congestion of receive errors, the frequency of switching between the recovery processing and the VMD processing can be reduced, and the processing load on the microprocessor and memory circuits within the VMD circuit 10 can be reduced.

It is understood that the foregoing description and accompanying drawings set forth the preferred embodiments of the invention at the present time. Various modifications, additions and alternatives will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on Japanese Patent Application No. 2004-104903 which is hereby incorporated by reference.

What is claimed is:

1. An image data processing circuit comprising: data writing means for writing received image data into an image data memory in turn; data reading means for reading image data from said image data memory in response to read addresses; and error detection means for detecting a receive error, wherein said data reading means selectively performs a still image reading mode and a video reading mode, said still image reading mode causing said data reading means to read the image data while temporarily fixing the read addresses within an error occurrence interval, and said video reading mode causing said data reading means to read the image data while changing the read addresses in the order of writing the image data into said image data memory, said image data processing circuit further comprising:
error history storage means for storing, as error history information, a status of occurrence of a receive error based on the detection results of said error detection means; and
control means for detecting recovery from the receive error based on the detection results and controlling said data reading means based on the error history information stored in said error history storage means in response to the detection.

2. An image data processing circuit according to claim 1, wherein said control means judges based on the error history information whether a frequency of the occurrence of the receive error is less than a first threshold value, and causes said data reading means to continuously perform said video reading mode following data reading immediately after the recovery from the receive error, over a long time interval compared with a status in which the frequency of the occurrence is equal to or greater than said first threshold value.

3. An image data processing circuit according to claim 1 or claim 2, wherein said control means judges based on the error history information whether a frequency of the occurrence of the receive error is equal to or greater than a second threshold value, and causes said data reading means to continuously perform said video reading mode following data reading immediately after the recovery from the receive error, over a time period until an occurrence of the next receive error.

\* \* \* \* \*